M. J. TRUMBLE.
STEAM BOILER.
APPLICATION FILED FEB. 18, 1920.

1,365,608.

Patented Jan. 11, 1921.

Inventor
Milton J. Trumble
by Graham & Harris
Attorneys

UNITED STATES PATENT OFFICE.

MILON J. TRUMBLE, OF ALHAMBRA, CALIFORNIA.

STEAM-BOILER.

1,365,608.  Specification of Letters Patent.  Patented Jan. 11, 1921.

Application filed February 18, 1920. Serial No. 359,678.

*To all whom it may concern:*

Be it known that I, MILON J. TRUMBLE, a citizen of the United States, residing at Alhambra, county of Los Angeles, State of California, have invented a new and useful Improvement in Steam-Boilers, of which the following is a specification.

My invention relates to steam boilers and more particularly to steam boilers which are especially adapted for use on tractors, automobiles and the like.

The object of the invention is to provide a steam boiler which can be economically produced and which will be very strong and efficient and which will not "prime" or foam.

Further objects and advantages will be set forth more in detail hereinafter.

Figure 1:
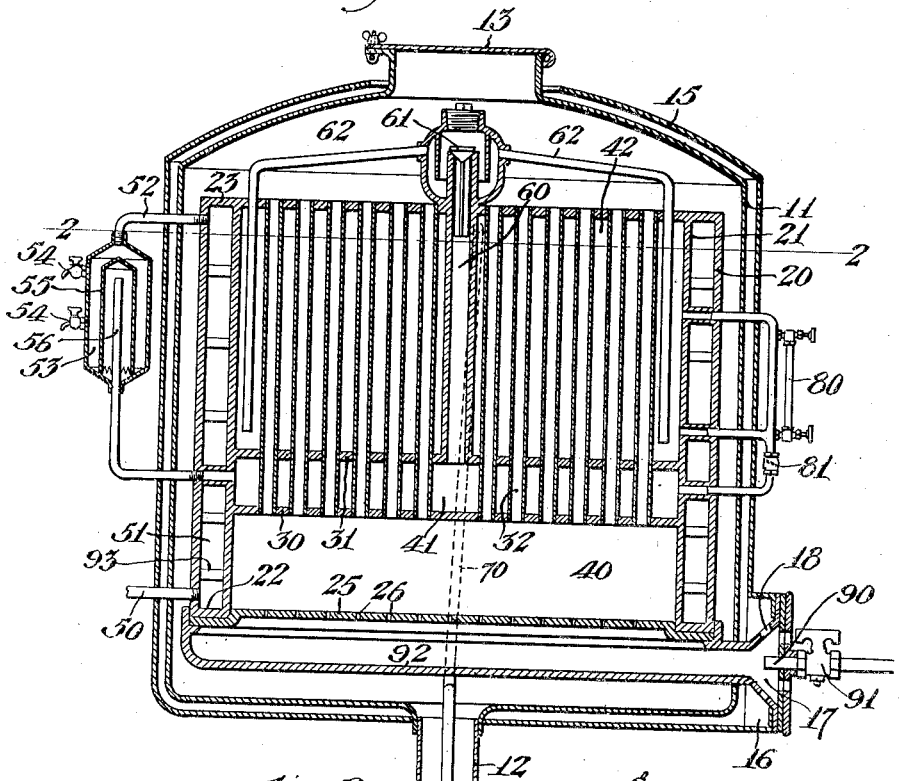

Referring to the drawings which are for illustrative purposes only, Figure 1 is a vertical section through a steam boiler embodying my invention.

Figure 2:
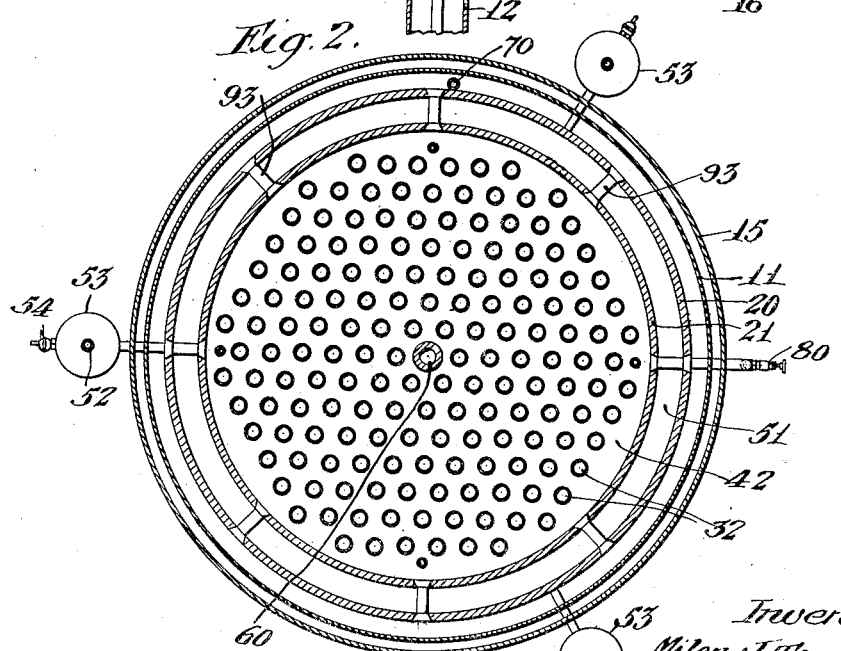

Fig. 2 is a section on a line represented by the line 2—2 of Fig. 1.

In the embodiment of my invention shown, 11 is a shell which communicates at its bottom with a flue 12, and which is provided with a handhole and cover 13. Located outside and spaced apart from the shell 11 is a jacket 15, forming an air intake space which communicates with a space 16 around a mixer 17, air inlets 18 being provided in the wall of the mixer through which air may be taken from air intake space. Located inside the shell 11 is an outer cylinder 20 and an inner cylinder 21. These cylinders are connected together at the bottom by an annular metal member 22 and are secured at the top to a head 23. Secured inside the shell 20 at the bottom thereof is a burner plate 25, having a plurality of perforations 26 therein. Intermediate heads 30 and 31 are secured inside the cylinder 21. Tubes 32 are secured in the head 30 and in the head 23 and are expanded in the head 31. The heads 30 and 31 divide the interior of the cylinder 21 into three spaces, namely, combustion chamber 40, a pre-heating chamber 41 and a heating chamber 42. The combustion chamber 40 communicates with the interior of the tubes 32 which also communicate with the space above the head 23 inside the shell 11.

A water inlet pipe 50 is provided which passes through the jacket 21 and the shell 11 into the cylinder 20 communicating with a water space 51 between the cylinders 20 and 21. Water from this space 51 is taken through pipes 52 into the mud drums 53 which are each provided with pet-cocks 54 and with a baffle 55, water being delivered inside the baffle 55 to a pipe 56 which passes through the shell 11, the jacket 15 and through the cylinders 20 and 21, delivering the water into the pre-heating space 41 at the periphery thereof. This water passes radially through the preheating space 41 and upwardly through a tube 60 and past a check valve 61, this water being delivered through a plurality of pipes 62 into the bottom of the heating space 42. Steam is delivered from the top of the heating space 42 into a pipe 70 which passes to the engine through the flues 12. A water gage 80 is connected into the spaces 41 and 42, a check valve 81 being provided to prevent the water from flowing upwardly through the water glass.

A gas supply pipe 90 controlled by a valve 91 delivers gas to the space between the burner plate 25 and a diaphragm 92 which forms a tight chamber therebeneath. Rivets 93 are utilized to space the cylinders 20 and 21 which are mutually self-supporting thus making an extremely strong shell.

The method of operation is as follows:

Gas delivered by the pipe 90 to the mixer 17, is mixed with heated air which has been drawn down between the shell 11 and the jacket 15. The mixture of gas and warm air is delivered to the chamber below the burner plate 25, passing through the small perforations therein and being ignited in the combustion chamber 40. The products of combustion pass upwardly through the tubes 32 and downwardly through the annular space between the shell 11 and the cylinder 20, being finally withdrawn through the flue 12. The water delivered under pressure through the pipe 50 is heated in the space between the cylinders 20 and 21 before passing to the mud drums 53, where various impurities may be taken out. This heated water is delivered to the pre-heating space 41 where it is still further heated and through the check valve 61, and the pipe 62, to the heating space 42 where it is changed to steam, this steam being delivered through the pipe 70 to the engine.

I claim as my invention:

1. In a steam boiler; an outer cylinder; an inner cylinder spaced apart from said outer cylinder to form an annular pre-heating space; means for closing the top of said space; means for closing the bottom of said space; two plates secured to the inner surface of said inner cylinder intermediate of its ends and spaced apart to form a pre-heating space; a head secured to the top of said inner cylinder and forming a heating space above said pre-heating space; tubes passing through said heating and pre-heating spaces; means for supplying hot combustion gases to the interior of said tubes; means for withdrawing fluid from the center of said pre-heating space and delivering it to the bottom of said heating space; means for withdrawing steam from the top of said heating space; means for delivering fluid from the top of said annular space to the periphery of said pre-heating space; and means for delivering fluid to said annular space.

2. In a steam boiler; an outer cylinder; an inner cylinder spaced apart from said outer cylinder to form an annular pre-heating space; means for closing the top of said space; means for closing the bottom of said space; two plates secured to the inner surface of said inner cylinder intermediate of its ends and spaced apart to form a pre-heating space; a head secured to the top of said inner cylinder and forming a heating space above said pre-heating space; tubes passing through said heating and pre-heating spaces; a burner plate fitting into the bottom of said inner cylinder and forming a combustion chamber below said pre-heating chamber said tubes being in open communication with said combustion space; means for maintaining a combustion in said combustion chamber; means for withdrawing fluid from the center of said pre-heating space and delivering it to the bottom of said heating space; means for withdrawing steam from the top of said heating space; means for delivering fluid from the top of said annular space to the periphery of said pre-heating space; and means for delivering fluid to said annular space.

3. In a steam boiler; an outer cylinder; an inner cylinder spaced apart from said outer cylinder to form an annular pre-heating space; means for closing the top of said space; means for closing the bottom of said space; two plates secured to the inner surface of said inner cylinder intermediate of its ends and spaced apart to form a pre-heating space; a head secured to the top of said inner cylinder and forming a heating space above said pre-heating space; tubes passing through said heating and pre-heating spaces; a burner plate fitting into the bottom of said inner cylinder and forming a combustion chamber below said pre-heating chamber, said tubes being in open communication with said combustion space; a plate coöperating with said burner plate to form a mixing chamber below said burner plate; said burner plate being perforated; means for supplying gas and air to said mixing chamber; means for withdrawing fluid from the center of said pre-heating space and delivering it to the bottom of said heating space; means for withdrawing steam from the top of said heating space; means for delivering fluid from the top of said annular space to the periphery of said pre-heating space; and means for delivering fluid to said annular space.

In testimony whereof, I have hereunto set my hand at Los Angeles, California, this 11th day of February, 1920.

MILON J. TRUMBLE.